United States Patent [19]

Straub et al.

[11] 4,182,851

[45] Jan. 8, 1980

[54] PROCESS FOR REDUCING THE RESIDUAL MONOMER CONTENT IN THE POLYMERIZATION OF VINYL-LACTAMS AND VINYL ESTERS

[75] Inventors: Ferdinand Straub, Hockenheim; Herbert Spoor, Limburgerhof; Hans-Uwe Schenck, Wachenheim; Wolfgang Schwarz, Ludwigshafen, all of Fed. Rep. of Germany

[73] Assignee: BASF Aktiengesellschaft, Fed. Rep. of Germany

[21] Appl. No.: 919,449

[22] Filed: Jun. 27, 1978

[30] Foreign Application Priority Data

Jul. 2, 1977 [DE] Fed. Rep. of Germany ....... 2730017

[51] Int. Cl.$^2$ .................... C08F 6/10; C08F 218/04; C08F 218/08
[52] U.S. Cl. .................................... 528/491; 526/264; 528/481
[58] Field of Search .................. 526/86, 264; 528/481, 528/491

[56] References Cited

U.S. PATENT DOCUMENTS

| | | | |
|---|---|---|---|
| 2,497,705 | 2/1950 | Werntz | 526/264 |
| 2,665,271 | 1/1954 | Beller | 526/264 |
| 2,667,473 | 1/1954 | Morner et al. | 526/264 |
| 2,914,516 | 11/1959 | Siggia et al. | 528/491 |
| 4,020,267 | 4/1977 | Park | 528/491 |

*Primary Examiner*—Harry Wong, Jr.
*Attorney, Agent, or Firm*—Keil & Witherspoon

[57] ABSTRACT

A process for reducing the residual monomer content of a copolymer prepared by copolymerizing vinyl esters and N-vinyl-lactams in a solvent in the presence of a free radical polymerization initiator. Following the main polymerization, from 0.05 to 0.5% by weight, based on the monomers employed, of di-tert.-butyl peroxide, di-tert.-amyl peroxide, dicumyl peroxide, 2,5-dimethyl-2,5-bis-(tert.-butylperoxy)-hexane, 2,2-bis-(tert.-butylperoxy)-butane, 1,1-bis-(tert.-butylperoxy)-3,3,5-trimethylcyclohexane, 4,4-di-(tert.-butylperoxy)-butyl valerate, or a mixture of these, is added to the reaction mixture and the after-polymerization is carried out at a higher temperature than the main polymerization.

5 Claims, No Drawings

PROCESS FOR REDUCING THE RESIDUAL MONOMER CONTENT IN THE POLYMERIZATION OF VINYL-LACTAMS AND VINYL ESTERS

The present invention relates to a process for reducing the residual monomer content in the polymerization of vinyl esters and vinyl-lactams in a solvent, by adding a polymerization initiator subsequent to the main polymerization, and after-polymerizing the reaction mixture.

It is known that in polymerization reactions small amounts of monomers remain unconverted. However, particularly the polymers intended for cosmetic or pharmaceutical purposes should have extremely low residual monomer contents. Pulverulent polymers obtained, for example, by spray drying the polymer solutions, in general only contain small amounts of residual monomer. However, if it is desired to use polymer solutions it is not possible to remove the unpolymerized monomers substantially by, for example, distillation. It is true that the polymer solution can be converted to a pulverulent polymer by spray drying and this product redissolved in pure solvent. The process of spray drying and redissolution, however, is involved and in the case of polyvinyllactams does not result in polymer solutions which have a very low residual monomer content.

U.S. Pat. No. 2,665,271 discloses a process for polymerizing N-vinyl-lactams wherein these are first polymerized in accordance with a conventional process, using inorganic or organic peroxides, which decompose under the reaction conditions, as the initiators, and the reaction mixture is then subjected to an after-polymerization as soon as the monomer content reaches a constant value. The after-polymerization is carried out by adding further peroxide to the reaction mixture, which is then heated. The monomer content is about 6% after the main polymerization, and can be reduced to about 0.9% by after-polymerizing the reaction mixture.

It is an object of the present invention to provide a process for reducing the residual monomer content in the polymerization of vinyl esters and vinyl-lactams in a solvent, by adding a polymerization initiator subsequent to the main polymerization, and after-polymerizing the reaction mixture, which process gives a polymer solution which has a very low residual monomer content.

We have found that this object is achieved, according to the invention, by adding to the reaction mixture, after completion of the main polymerization, from 0.05 to 0.5% by weight, based on the monomers employed, of di-tert.-butyl peroxide, di-tert.-amyl peroxide, dicumyl peroxide, 2,5-dimethyl-2,5-bis-(tert.-butylperoxy)-hexane, 2,2-bis(tert.-butylperoxy)-butane, 1,1-bis-(tert.-butylperoxy)-3,3,5-trimethylcyclohexane or 4,4-di-(tert.-butylperoxy)-butyl valerate, and carrying out the after-polymerization at a higher temperature than the main polymerization.

The advantage of the process of the invention is that it does not interfere with the desired degree of polymerization and also does not have an adverse effect on the color of the products. It is surprising that by selecting a dialkyl peroxide or perketal as the polymerization initiator for the after-polymerization, polymer solutions are obtained in which the residual monomer content is lower by a factor of from 10 to 20 than the residual monomer content in polymer solutions prepared by conventional processes.

Vinyl-lactams to use in the process are especially N-vinylpyrrolidone, N-vinylpiperidone and N-vinylcaprolactam. By means of the process of the invention it is possible to produce N-vinyl-lactam homopolymer and copolymer solutions having a low residual monomer content. The process is of particular importance in the preparation of copolymers of vinyl-lactams and especially of copolymers of N-vinylpyrrolidone. Examples of suitable monomers copolymerizable with N-vinylpyrrolidone are vinyl esters of saturated fatty acids of 2 to 20 carbon atoms, eg. vinyl acetate, vinyl propionate, vinyl butyrate, vinyl isobutyrate, vinyl lactate, vinyl caproate, vinyl caprylate, vinyl oleate and vinyl stearate, acrylic esters and methacrylic esters derived from alcohols of 1 to 12 carbon atoms, eg. methyl acrylate, ethyl acrylate, isobutyl acrylate and 2-ethylhexyl acrylate, and acrylic esters and methacrylic esters derived from basic alcohols, eg. aminoethanol or aminopropanol, and also acrylamide, N-methylolacrylamide and N-methylolmethacrylamide.

Copolymers of particular industrial interest contain, for example, from 10 to 90% by weight of vinyl-lactam and from 90 to 10% by weight of a vinyl ester, preferably vinyl acetate or vinyl propionate. The vinyl-lactams may also be copolymerized with more than one comonomer, for example with vinyl acetate and vinyl isobutyrate, or with vinyl acetate and ethyl acrylate. Preferred copolymers are based on N-vinylpyrrolidone and from 80 to 20% by weight of vinyl acetate.

The monomers are polymerized in conventional solvents, in which the monomers or monomer mixtures are soluble. Examples of suitable solvents are water, alcohols, hydrocarbons, halohydrocarbons, esters, ketones and ethers. Specific examples of the categories mentioned are methanol, ethanol, n- and iso-propanol, cyclopentanol, cyclohexanol, methylene chloride, 1,1,1-trichloroethane, 1,1,2-trifluoroethane, 1,1,2-trichloroethane, ethylene glycol, propanediol, butanediol, hexylene glycol, methyl acetate, ethyl acetate, benzyl acetate, acetone, ethylene glycol monomethyl ether and ethylene glycol monoethyl ether. Of course, mixtures of the said solvents may also be employed, eg. mixtures of water and isopropanol or mixtures of isopropanol and acetone. In general, the polymer concentration in the solution is from 5 to 95%.

The conventional free radical polymerization initiators may be used for the main polymerization stage, examples being azobisisobutyronitrile, diacyl peroxides, eg. dibenzoyl peroxide or dilauroyl peroxide, peresters, eg. tert.-butyl perpivalate, tert.-butyl peroctoate, tert.-butyl peracetate or tert.-butyl perbenzoate, hydrogen peroxide and hydroperoxides, eg. tert.-butyl hydroperoxide or cumene hydroperoxide.

The monomers are polymerized in the conventional manner at from 40° to 160° C., preferably from 45° to 100° C., as a rule under atmospheric pressure. Usually, the polymerization is carried out at the boiling point of the solvent or solvent mixture. The polymerization temperature can thus be varied easily by appropriate selection of the solvent. The polymerization may be carried out continuously or batchwise. For example, it is possible to take the monomer solution and add one or more polymerization initiators over an extended period, or to introduce the monomer solution and the polymerization initiator continuously or batchwise into a polymerization vessel. The polymerization requires, for example, from 0.05 to 1% by weight, based on the monomers, of a polymerization initiator. The larger the amount of peroxide employed, the lower is the K value of the resulting polymer. These K values lie in the range from 10 to 90.

When preparing a copolymer of N-vinylpyrrolidone and vinyl acetate it is particularly difficult substantially to reduce the residual vinyl acetate monomer content after completion of the main polymerization. If, however, in accordance with the invention, a dialkyl peroxide, eg. di-tert.-butyl peroxide, di-tert.-amyl peroxide, dicumyl peroxide or 2,5-dimethyl-2,5-bis-(tert.-butyl-peroxy)-hexane, or a perketal, eg. 2,2-bis-(tert.-butyl-peroxy)-butane, 1,1-bis-(tert.-butylperoxy)-3,3,5-trimethylcyclohexane or 4,4-di-(tert.-butylperoxy)-n-, -iso- or -tert.-butyl valerate, is employed and the reaction mixture is heated to above the temperature of the main polymerization reaction, it proves possible, surprisingly, to effect a drastic reduction in the residual monomer content of the polymer solution. The dialkyl peroxides and dialkyl perketals are employed in an amount of from 0.05 to 0.5% by weight, based on the monomers originally employed. Of course it is also possible to use a mixture of 2 or more of the above peroxides in the after-polymerization, eg. a mixture of di-tert.-butyl peroxide and dicumyl peroxide or of di-tert.-butyl peroxide and 2,2-bis-(tert.-butylperoxy)-butane.

The after-polymerization is carried out at from 100° to 200° C., preferably from 110° to 160° C. Because of the solvents used in the main polymerization it may be necessary to carry out the after-polymerization under a pressure of from 1 to about 50 bars. If the after-polymerization is carried out under superatmospheric pressure the preferred range is from 2 to 7 bars. The after-polymerization time is from 0.5 to 5 hours.

The Examples which follow illustrate the invention. Parts are by weight and the percentages are by weight of the materials. The K values quoted in the description and in the Examples were determined by the method of H. Fikentscher, Cellulosechemie, 13 (1932), 58–64 and 71–74, in 5% strength solution in dimethylformamide at 20° C.; $K = k \cdot 10^3$.

EXAMPLES

10% of a solution of 6 kg of N-vinylpyrrolidone, 6 kg of vinyl acetate, 12 kg of isopropanol and 36 g of azobisisobutyronitrile are introduced into a 40 liter kettle, equipped with a stirrer, reflux condenser and feed vessel, and are heated to 80° C. When the polymerization has started, the remaining monomer solution is added over about 5 hours. The main polymerization of the monomers is carried out at from 72° to 85° C., with the mixture boiling gently. After 5.5 hours, a polymer solution containing 12.6% of vinyl acetate monomer and 2.4% of N-vinylpyrrolidone monomer is obtained.

To reduce the residual monomer content of the above polymer solution, the polymerization initiators shown in the Table below, dissolved in isopropanol, are added over half an hour. The amount of added polymerization initiator is in each case 0.2% based on the monomers originally employed for the polymerization. The after-polymerization is carried out at a higher temperature than the main polymerization. The reaction conditions and the residual monomer contents in the polymer solution are shown in the Table below.

The comparative Examples represent the prior art as described in U.S. Pat. No. 2,665,271.

TABLE

| Example No. | After-polymerization initiator % | Amount h | Time °C. | Temp. bars | Pressure VAC % | Residual VP % | monomer |
|---|---|---|---|---|---|---|---|
| 1 | Di-tert.-butyl peroxide | 0.2 | 4 | 140 | 4 | 0.02 | 0.01 |
| 2 | Di-tert.-amyl peroxide | 0.2 | 4 | 140 | 4 | 0.003 | 0.009 |
| 3 | Dicumyl peroxide | 0.2 | 4 | 130 | 3 | 0.06 | 0.003 |
| 4 | 2,5-Dimethyl-2,5-di-(tert.-butyl-peroxy)-hexane | 0.2 | 4 | 130 | 3 | 0.01 | 0.008 |
| 5 | 2,2-Bis-(tert.-butylperoxy)-butane | 0.2 | 4 | 130 | 3 | 0.09 | 0.009 |
| Comparative Example No. | After-polymerization initiator | Amount % | Time h | Temp. °C. | Pressure bars | Residual VAC % | monomer VP % |
| 1 | Azobisisobutyronitrile | 0.3 | 5 | 82 | reflux | 3.2 | 0.4 |
| 2 | tert.-Butyl perpivalate | 0.3 | 5 | 82 | reflux | 0.44 | 0.005 |
| 3 | tert.-Butyl peroctoate | 0.3 | 5 | 82 | reflux | 0.36 | 0.006 |

We claim:
1. A process for reducing the residual monomer content in a polymer solution obtained from the copolymerization of vinyl ester and N-vinyl-lactams in a solvent, the copolymer produced containing from 10 to 90% by weight of N-vinyl-lactam and from 90 to 10% by weight of vinyl ester, based on the monomers, which comprises:
   (a) polymerizing the vinyl esters and N-vinyl-lactams to completion of the polymerization reaction at temperatures of from 45° to 100° C.;
   (b) adding from 0.05 to 0.5% by weight, based on the monomers employed, of at least one peroxide selected from the group consisting of di-tert.-butyl peroxide, di-tert.-amyl peroxide, dicumyl peroxide, 2,5-dimethyl-2,5-bis-(tert.-butylperoxy)-hexane, 2,2-bis-(tert.-butyl peroxy)-butane, 1,1-bis-(tert.-butylperoxy)-3,3,5-trimethylcyclohexane or 4,4-di-(tert.-butylperoxy)-butyl valerate, and then
   (c) after-polymerizing the mixture obtained from step (b) at temperatures of from 110° to 160° C. to reduce the residual monomer content to a value less than about 0.1%.

2. A process as set forth in claim 1, wherein the polymerization of step (a) is carried out under atmospheric pressure and the after-polymerization is carried out under a pressure of from 1 to 50 bars.

3. A process as set forth in claim 1, wherein N-vinylpyrrolidone is employed as the vinyl-lactam.

4. A process as set forth in claim 1, wherein the after-polymerization is carried out for from 0.5 to 5 hours.

5. A process as set forth in claim 3, wherein the vinyl ester employed is vinyl acetate.

* * * * *